(12) United States Patent
Edanami

(10) Patent No.: US 6,628,804 B1
(45) Date of Patent: Sep. 30, 2003

(54) METHOD AND APPARATUS FOR MEASURING SPEED OF VEHICLE

(75) Inventor: Takafumi Edanami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/505,536

(22) Filed: Feb. 17, 2000

(30) Foreign Application Priority Data

Feb. 19, 1999 (JP) ........................................... 11-041364

(51) Int. Cl.[7] .................................................. G06K 9/00
(52) U.S. Cl. ...................................... 382/107; 382/104
(58) Field of Search .............................. 382/107, 103, 382/104, 105, 168; 348/149, 169; 340/936

(56) References Cited

U.S. PATENT DOCUMENTS

| | | | |
|---|---|---|---|
| 5,051,906 A | * 9/1991 | Evans et al. | ................... 701/28 |
| 5,404,306 A | * 4/1995 | Mathur et al. | ............... 701/117 |
| 5,691,902 A | * 11/1997 | Taniguchi et al. | ........... 701/119 |
| 5,995,900 A | * 11/1999 | Hsiao et al. | ................. 701/117 |
| 6,201,883 B1 | * 3/2001 | Mizui | ......................... 382/109 |

FOREIGN PATENT DOCUMENTS

| | | | |
|---|---|---|---|
| JP | 5-266394 | 10/1993 | .......... G08G/1/017 |
| JP | 5-312818 | 11/1993 | ............. G01P/3/36 |
| JP | 7-271956 | 10/1995 | ............. G06T/1/00 |

* cited by examiner

Primary Examiner—Brian Werner
Assistant Examiner—Ryan J. Miller
(74) Attorney, Agent, or Firm—Katten Muchin Zavis Rosenman

(57) ABSTRACT

A method for measuring the speed of a vehicle which enables measurement of the speed of a vehicle with a high accuracy by an image pickup camera mounted to a single simple supporting pole installed at the side of a field, including capturing a vehicle in motion by an image pickup unit mounted on a support provided at the side of a field, calculating an amount of movement in the vertical direction by an image of the vehicle captured by the image pickup unit on a display screen displaying the image, calculating an amount of movement in the horizontal direction by the image of the vehicle captured by the image pickup unit on the display screen displaying the image, converting the calculated amount of vertical movement and amount of horizontal movement based on information of the capture location of the image pickup unit in the real space of the vehicle and information of the attitude of the image pickup camera to an amount of vertical movement and amount of horizontal movement in that real space, and computing the speed of the vehicle from the amount of vertical movement and amount of horizontal movement in the real space of the vehicle and the movement time.

14 Claims, 14 Drawing Sheets

METHOD AND APPARATUS FOR MEASURING SPEED OF VEHICLE

BACKGROUND OF THE INVENTION

1. Field of the Invention

The present invention relates to a method and apparatus for measuring the speed of a vehicle.

The flow of traffic is monitored and controlled and observance of speed limits for vehicles is watched on general roads and highways so as to ensure smooth driving and maintain safe speeds.

In constructing such a road monitoring system, equipment is necessary for determining the speed of a moving vehicle. The present invention relates to a technique for measuring the speed of a vehicle for this purpose.

2. Description of the Related Art

As will be explained later in detail with reference to the drawings, in the past, accurate measurement of the speed of a vehicle required the installation of an image pickup camera directly above the route of travel of the vehicle. That is, the image pickup camera was installed directly above the route of travel so that the image of the vehicle taken by the image pickup camera would move in only the vertical direction on a display screen, for example, a monitor screen. Toward this end, it was necessary to install mounting poles and an arm, provide an arm extending in the horizontal direction from the existing support of a traffic signal, use a pedestrian bridge, or devise other means.

If installing, mounting poles and an arm, however, there is the problem that the vehicular speed measuring system becomes considerably high in cost to construct the same. Further, there is the problem that during the construction work, the traffic has to be stopped.

If providing an arm extending in the horizontal direction from the existing support of a traffic signal, the arm attached to the support easily swings within a horizontal plane parallel to the road due to the wind pressure caused by wind or vehicles driving at a high speed and therefore there is the problem that accurate measurement of the speed.-of vehicles is not possible.

Further, if using a pedestrian bridge, the location of installation of vehicular speed measuring systems ends up being limited to places with pedestrian bridges and therefore there is the problem that the speed of vehicles cannot be measured at any desired location, which is inconvenient.

SUMMARY OF THE INVENTION

An object of the present invention is to provide a method and apparatus for measuring the speed of a vehicle which enable measurement of the speed of a vehicle with a high accuracy by an image pickup camera mounted to a single simple supporting pole installed at the side of a field.

That is, an object of the present invention is to enable measurement of the speed of a vehicle based on an image of the vehicle on a screen obtained by capturing the vehicle from a direction inclined relative to the route of travel—not from right above the route of travel of the vehicle as in the related art.

To attain the above object, the method of the present invention includes the steps of (S1) capturing a vehicle in motion by an image pickup unit mounted on a support provided at the side of a road, (S2) calculating an amount of movement in the vertical direction by an image of the vehicle captured by the image pickup unit on a display screen displaying the image, (S3) calculating an amount of movement in the horizontal direction by the image of the vehicle captured by the image pickup unit on the display screen displaying the image, (S4) converting the calculated amount of vertical movement and amount of horizontal movement based on information of the capture location of the image pickup unit in the real space of the vehicle and information of the attitude of the image pickup camera to an amount of vertical movement and amount of horizontal movement in that real space, and (S5) computing the speed of the vehicle from the amount of vertical movement and amount of horizontal movement in the real space of the vehicle and the movement time. Therefore, it becomes possible to accurately measure the speed of a vehicle being driven based on an image from an image pickup unit mounted on the top of a supporting pole installed at the side of a field.

BRIEF DESCRIPTION OF THE DRAWINGS

The above objects and features of the present invention will be more apparent from the following description of the preferred embodiments given with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 14:
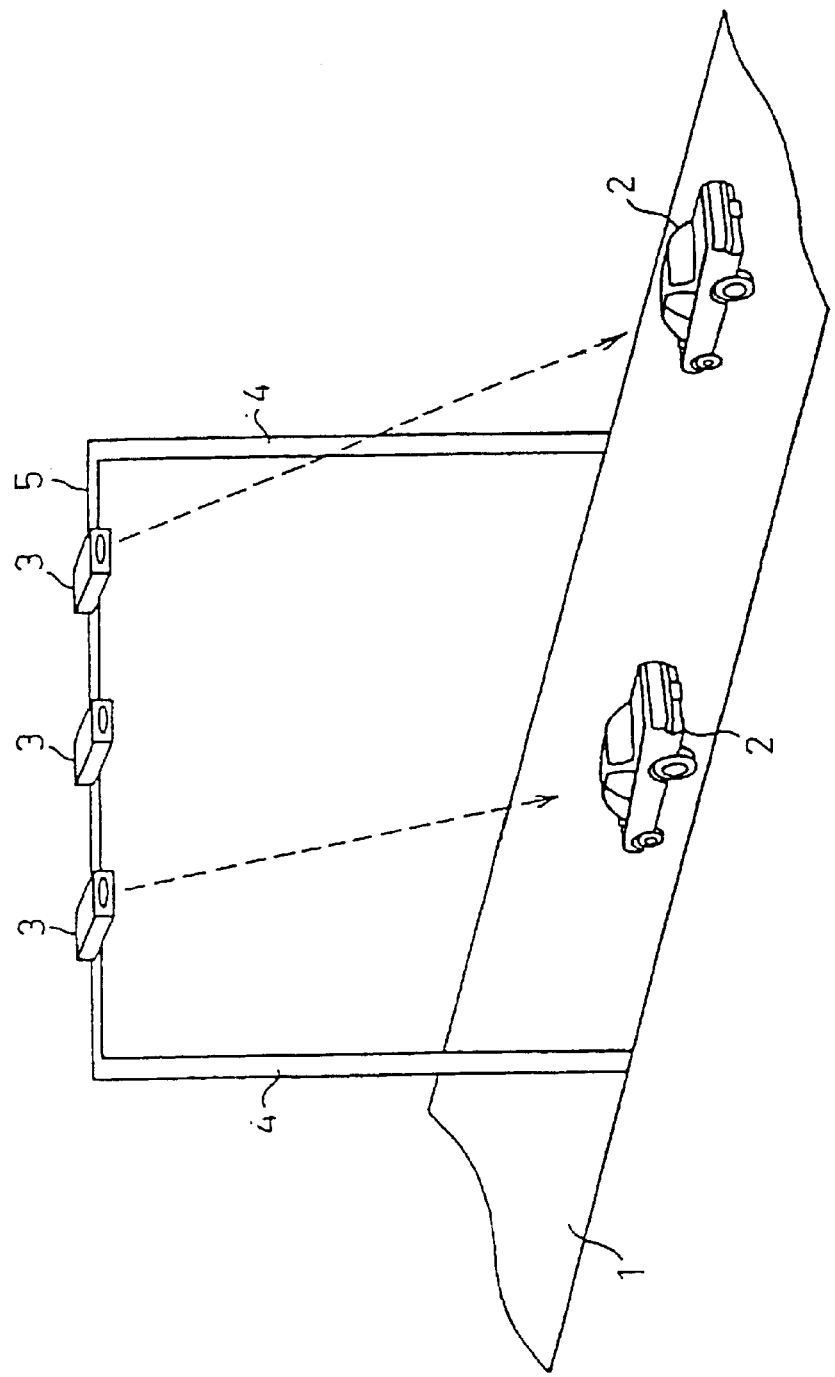
FIG. 14 is a perspective view of a general vehicular speed measurement system.

FIG. 14 is a perspective view of a general vehicular speed measurement system.

In the figure, reference numeral 1 is a general road or highway. A vehicle 2 is driving along the road 1.

The vehicular speed measurement system according to the present invention is comprised of various functional components, but of these, in the figure, just for example three image pickup cameras 3 corresponding to three lanes are shown. Note that as a related art for an apparatus for measuring the speed of a vehicle, there are Japanese Unexamined Patent Publication (Kokai) No. 5-312818 and Japanese Unexamined Patent Publication (Kokai) No. 5-266394.

Each of the image pickup cameras 3 is installed directly above a route of travel of a vehicle 2 to be captured. This is because to accurately measure the speed of the vehicle 2, it is necessary to measure the movement of the vehicle from directly above the direction of advance of the vehicle. To position an image pickup camera 3 directly above the route of travel of a vehicle, first mounting poles 4 are constructed at the two sides of the road 1, then an arm 5 is attached between the top ends of the pair of mounting poles 4 and the image pickup camera 3 is mounted on the arm 5.

Alternatively, a traffic signal installed at one of the sides of the road 1 is used, an arm provided extending above the road from the top of the support of the traffic signal, and an image pickup camera 3 mounted on that arm.

Alternately again, if there is a pedestrian bridge spanning the road 1, the image pickup camera 3 can sometimes be attached to part of the bridge.

As explained above in short, in the past, accurate measurement of the speed of a vehicle 2 required the installation of an image pickup camera 3 directly above the route of travel of the vehicle 2. That is, the image pickup camera 3 was installed directly above the route of travel so that the image of the vehicle captured by the image pickup camera 3 would move on the screen in only the vertical direction of the monitor screen. Toward this end, as explained above, it was necessary to install mounting poles 4 and an arm 5 (FIG. 14), provide an arm extending in the horizontal direction from the existing support of a traffic signal, use a pedestrian bridge, or devise other means.

If installing mounting poles 4 and an arm 5, however, there is the above problem that the vehicular speed measuring system becomes considerably high in cost to construct the same. Further, there is the problem that during the construction work, the traffic has to be stopped.

If providing an arm extending in the horizontal direction from the existing support of a traffic signal, the arm attached to the support easily swings within a horizontal plane parallel to the road due to the wind pressure caused by wind or vehicles driving at a high speed and therefore there is the problem that accurate measurement of the speed of vehicles is not possible.

Further, if using a pedestrian bridge, the location of installation of vehicular speed measurement systems ends up being limited to places with pedestrian bridges and therefore there is the above problem that the speed of vehicles cannot be measured at any desired location, which is inconvenient.

The present invention provides a method and apparatus for measuring the speed of a vehicle which enable measurement of the speed of a vehicle with a high accuracy by an image pickup camera mounted to a single simple supporting pole installed at the side of a road.

That is, the present invention enables measurement of the speed of a vehicle based on an image of the vehicle on a screen obtained by capturing the vehicle from a direction inclined relative to the route of travel—not from right above the route of travel of the vehicle as in the related art.

Figure 1:
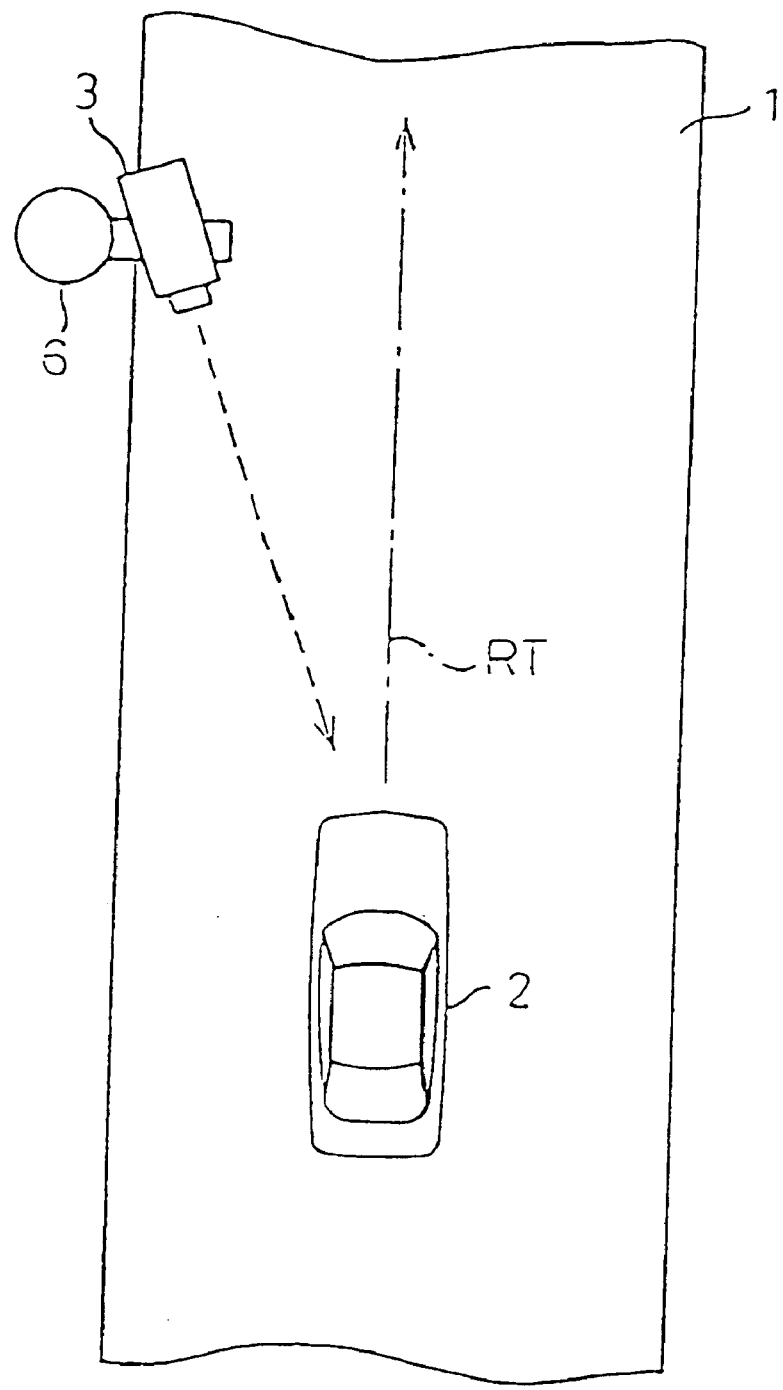
FIG. 1 is a plan view of a vehicular speed measuring system using the present invention.

FIG. 1 is a plan view of a vehicular speed measuring system using the present invention.

As shown in the figure, in the present invention, an image pickup camera 3 corresponding to the image pickup means is provided on a supporting pole 6 installed at the side of a road 1. Therefore, the arm 5 located directly above the route of travel RT and the mounting poles 4 for supporting the same in the related art become unnecessary. Accordingly, the image pickup camera 3 (corresponding to the image pickup functional part of the apparatus for measuring the speed of a vehicle in the present invention) captures the vehicle 2 traveling on the road 1 from a direction at a diagonally upward angle.

Figure 2:
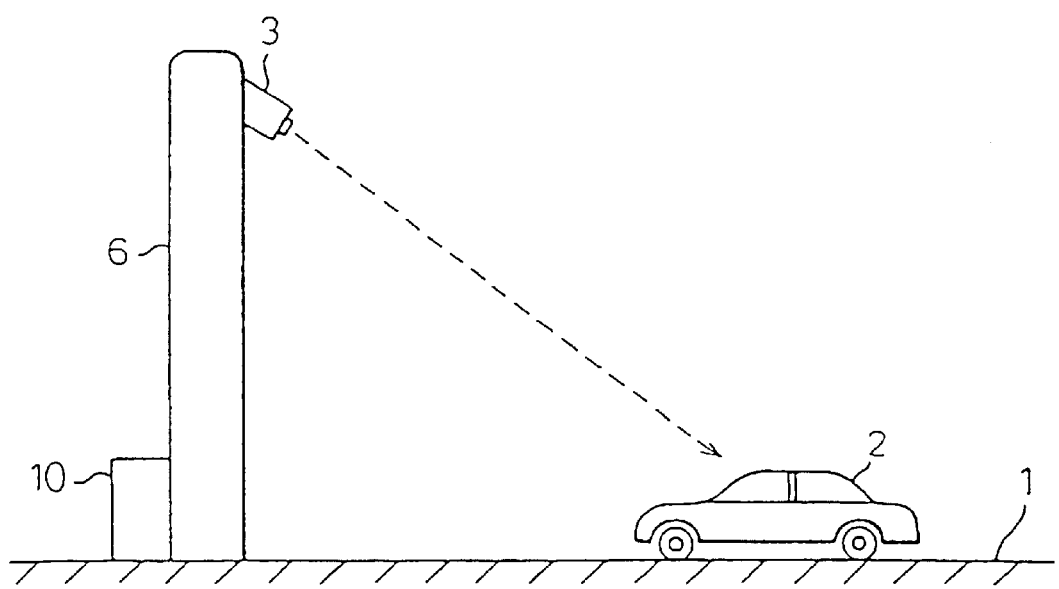
FIG. 2 is a side view seen from the left side of FIG. 1.

FIG. 2 is a side view as seen from the left side of FIG. 1. The image pickup camera 3 attached at the top of the supporting pole 6 captures the vehicle 2 traveling on the road 1 from a direction at a diagonally upward angle from the vehicle 2. Note that the supporting pole 6 may be newly provided for shooting vehicles or may be an existing support of a traffic signal or an existing telephone pole or power transmission pole. The pole 6 may have a speed measuring apparatus 10 attached to it. This, however, is not shown in FIG. 1. Note that the apparatus 10 may also be built into the housing of the image pickup camera 3.

As shown in FIG. 1 and FIG. 2, when capturing a vehicle by the image pickup camera 3 from a direction at a diagonally upward angle from the vehicle 2, the image of the vehicle moving in only the vertical direction on the screen showing that image in the past moves in not only the vertical direction (top-bottom direction) on the screen, but also in the horizontal direction (left-right direction).

As a result, it becomes difficult to correctly calculate the actual speed of the vehicle along the route RT of travel from the amount of movement of the image of the vehicle 2 moving at an angle on the screen in a simple way. The reason is that even if finding the speed of horizontal movement (Vx) of the image of the vehicle-2 on the screen and the speed of vertical movement (Vy), it is not possible to simply calculate the speed of the vehicle in real space from the square root of the sum of squares $(Vx^2+Vy^2)$. Therefore, the following method of measuring the speed of a vehicle is used in the present invention.

Figure 3:
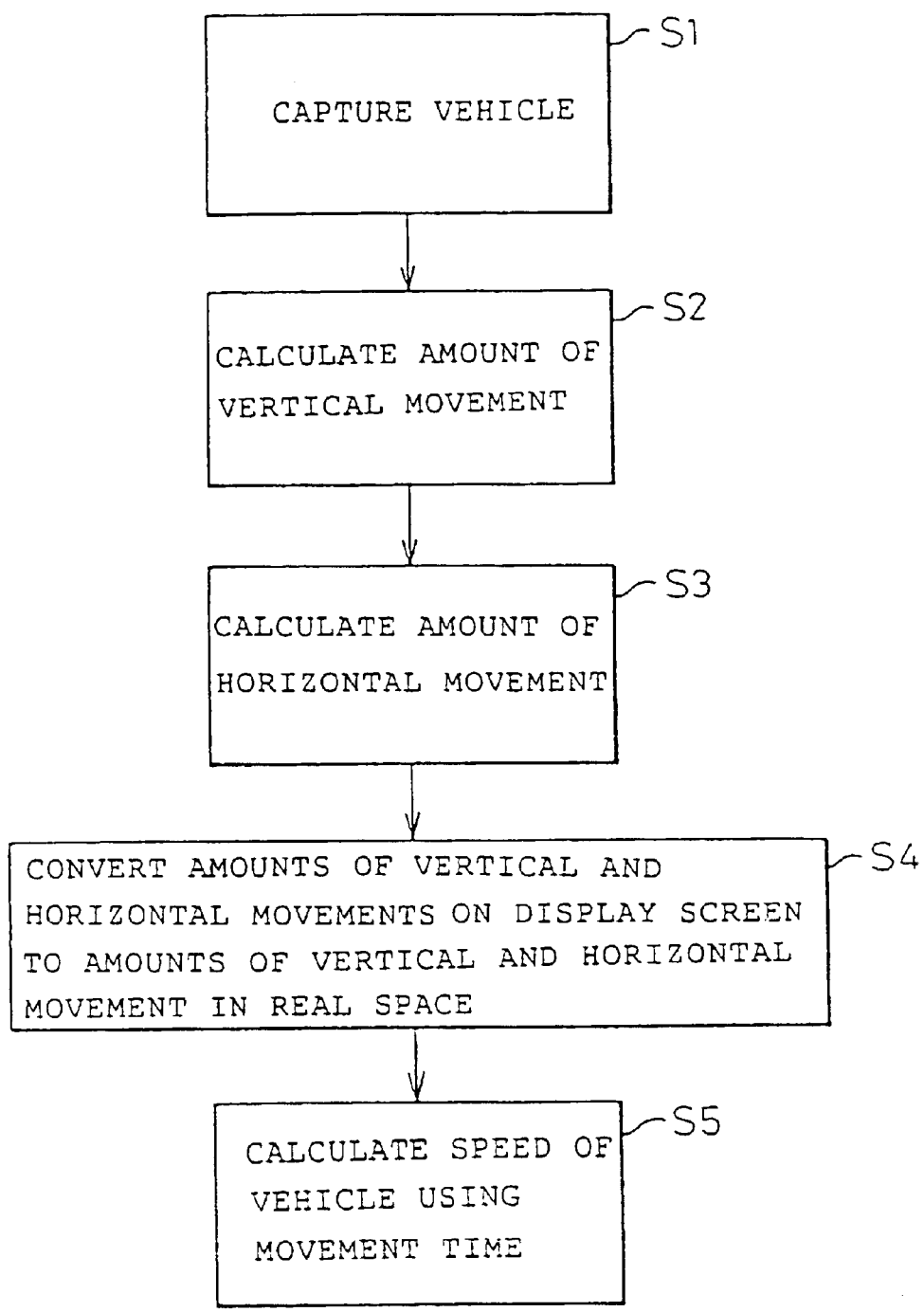
FIG. 3 is a flow chart of a method of measuring the speed of a vehicle according to the present invention.

FIG. 3 is a flow chart of the method of measuring the speed of a vehicle according to the present invention.

At the first step (S1), a vehicle 2 in motion is captured by an image pickup camera 3 mounted on a support (supporting pole 6) provided at the side of the road 1.

At the second step (S2), the amount of vertical movement of the image of the vehicle 2 captured by the image pickup camera 3 moving on the screen displaying that image is calculated.

At the third step (S3), the amount of horizontal movement of the image of the vehicle 2 captured by the image pickup camera 3 moving on the screen displaying that image is calculated.

At the fourth step (S4), the calculated amount of vertical movement and amount of horizontal movement are converted to the amount of vertical movement and amount of horizontal movement in the real space of the vehicle 2 based on the information of the capture location of the image pickup camera 3 in real space and the information of the attitude of the image pickup camera 3.

At the fifth step (S5), the speed of the vehicle 2 is calculated from the amount of vertical movement and amount of horizontal movement of the vehicle 2 in real space and the movement time.

Therefore, the real speed of the vehicle 2 in real space is found from the amounts of movement of the image on the screen captured from a direction at a diagonally upward angle.

Figure 4:
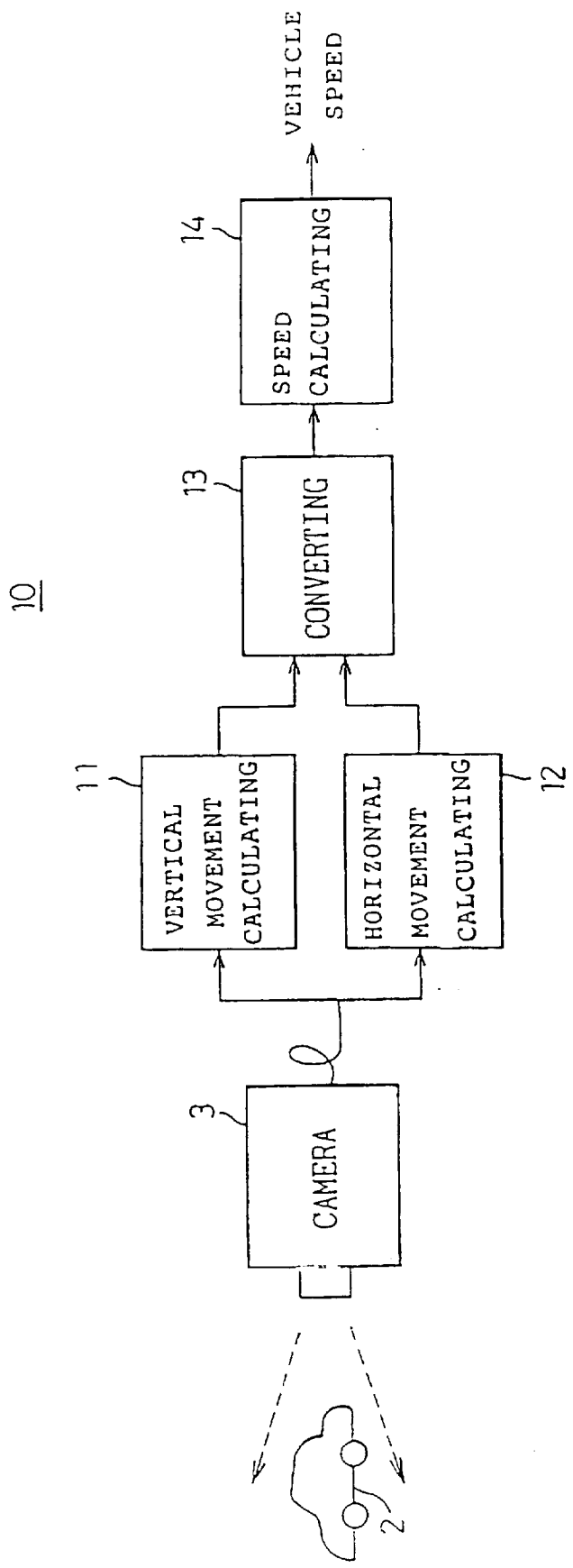
FIG. 4 is a view of the basic configuration of an apparatus for measuring the speed of a vehicle according to the present invention.

FIG. 4 is a view of the basic configuration of an apparatus for measuring the speed of a vehicle according to the present invention.

In the figure, reference numeral 3 represents an image pickup camera (image pickup means), 11 a means for calculating the amount of vertical movement, 12 a means for calculating the amount of horizontal movement, 13 a means for conversion, and 14 a means for calculating the speed of the vehicle.

The image pickup camera 3 is mounted on a support (supporting pole 6) provided at the side of the road 1 and captures the moving vehicle 2.

The vertical movement calculating means 11 calculates the amount of movement in the vertical direction of the image of the vehicle 2 output from the image pickup camera 3 moving on a display screen displaying the image.

The horizontal movement calculating means 12 calculates the amount of movement in the-horizontal direction of the image moving on the display screen.

The converting means 13 converts the amount of vertical movement and the amount of horizontal movement on the display screen, calculated by the vertical movement calculating means 11 and the horizontal movement calculating means 12, to the amount of vertical movement and the amount of horizontal movement in the real space of the vehicle 2 based on the information of the location of the image pickup camera 3 in real space and the information of the attitude of the image pickup camera 3.

The speed calculating means 14 calculates the speed of the vehicle 2 from the amount of vertical movement and the amount of horizontal movement in the real space of the vehicle 2 and the movement time.

Among the above components, the main one in the present invention is the converting means 13. The converting means 13 will be explained in detail below.

Figure 5:
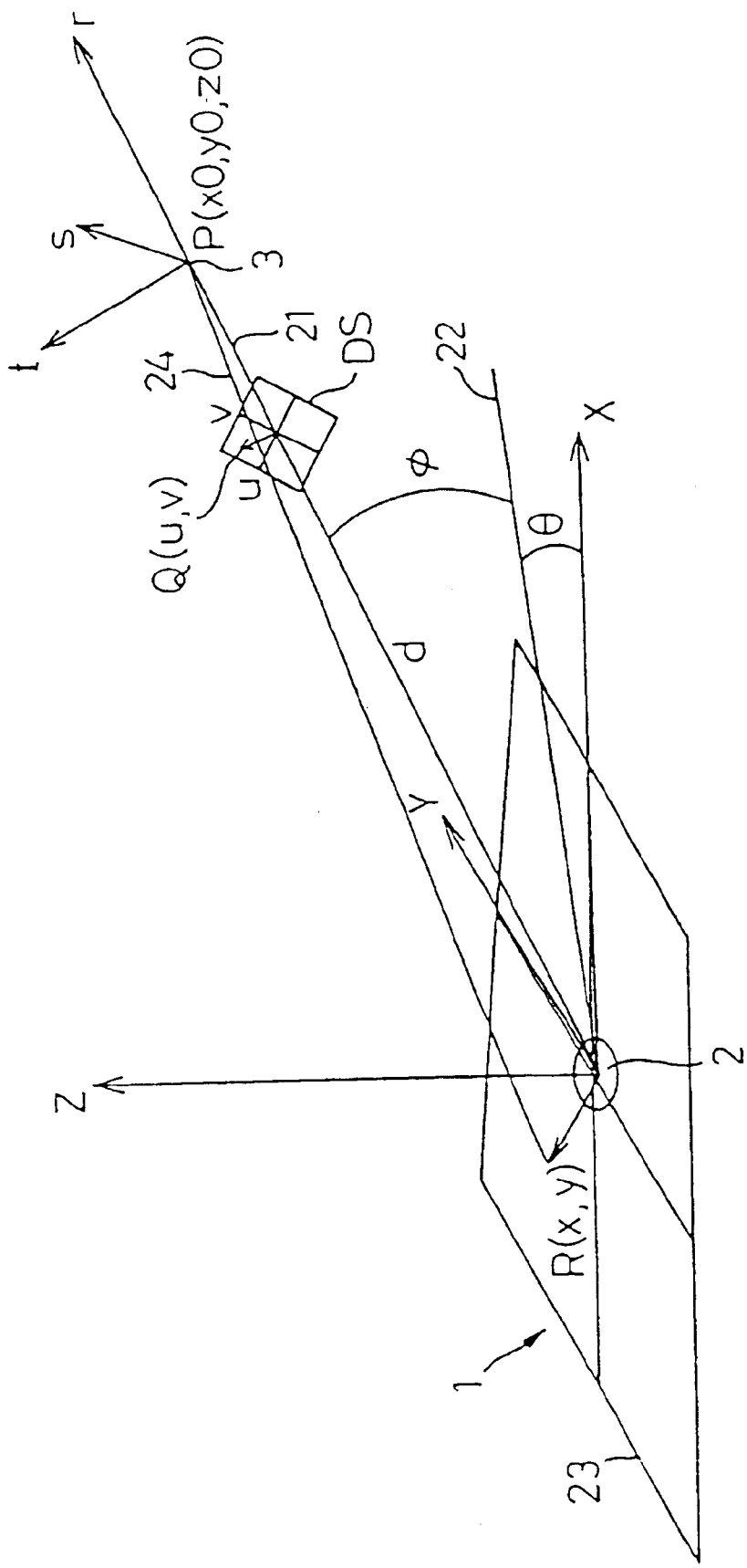
FIG. 5 is a 3D vector diagram for explaining the operating principle of a converting means 13 shown in FIG. 4.

FIG. 5 is a three-dimensional vector diagram for explaining the principle of operation of the converting means 13 shown in FIG. 4.

In the figure, the three-dimensional coordinate system (X-Y-Z) defined by the mutually orthogonal X-axis, Y-axis, and Z-axis shows the real space on the road 1 centered on the vehicle 2.

In this coordinate system (X-Y-Z), the line (21) extending above to the right is the optical axis of the image pickup camera-3. This image pickup camera 3 is positioned at the point P (perspective) in the coordinate system (X-Y-Z) having the coordinates (x0,y0,z0).

The display screen formed by the image pickup camera 3 is shown by DS in the figure. This display screen DS is a two-dimensional plane and can be expressed by a two-dimensional coordinate system (u-v) comprised of a mutually orthogonal u-axis and v-axis. The display screen DS, however, can in fact be behind (right side of figure) the lens of the camera 3 placed at the point P, but in the sense of being the display screen seen from the lens, it is drawn to the front of the lens (left side of figure) in this figure.

The three-dimensional coordinate system centered at the image pickup camera 3 is defined by the mutually orthogonal r-axis, s-axis, and t-axis. Among these, the r-axis is the optical axis of the camera 3. The real space centered at the camera 3 has a three-dimensional coordinate system (r-s-t) twisted with respect to the three-dimensional coordinate system (X-Y-Z) since the camera 3 captures the vehicle 2 from a diagonally upward angle. This twist relates to the information of the attitude of the image pickup camera 3. Referring to the figure, the information of the attitude includes the information of the directional angle θ corresponding to the angle of offset from the first axis (in the figure, the X-axis corresponding to the direction of travel of the vehicle 2) in real space (coordinate system X-Y-Z). This directional angle θ is the angle formed between the line 22 of projection of the optical axis 21 and the X-axis.

The information of the attitude includes the information of a dip angle φ corresponding to an angle of offset from the first axis and the second axis orthogonal to the first axis (in the figure, the Y-axis) in real space (coordinate system X-Y-Z).

The point Q(u,v) of the image of the vehicle 2 appearing in the two-dimensional coordinate system (u-v) on the display screen DS having as its origin the optical axis 21 having the above directional angle θ and dip angle φ appears at the point R in the area 23 in the real space of the X-Y-Z coordinate system. The point R is shown in the figure as R(x,y) since z=0. Here, the area 23 is the "screen corresponding area" corresponding to the view of the display screen DS. The area 23 forms a trapezoidal shape when-viewed from the top of the Z-axis. The reason is that the side close to the image pickup camera 3 (lower side of display screen DS) is projected short, while the side far from the camera 3 (upper side of display screen DS) is projected long.

If the coordinates expressing the position (Q) of the image of the vehicle 2 on the display screen DS in terms of the three-dimensional coordinate system (X,Y,Z) defining the above real space are made (x', y', z') based on the analysis by FIG. 5, the coordinates (x', y', z') can be expressed for example by the following equation (1):

$$\begin{pmatrix} x' \\ y' \\ z' \end{pmatrix} = \begin{pmatrix} \cos\theta & \sin\theta & 0 \\ -\sin\theta & \cos\theta & 0 \\ 0 & 1 & 1 \end{pmatrix} \begin{pmatrix} -\sin\theta & 0 & \cos\phi \\ 0 & 1 & 0 \\ \cos\phi & 0 & \sin\phi \end{pmatrix} \begin{pmatrix} f \\ u \\ v \end{pmatrix} + \begin{pmatrix} x0 \\ y0 \\ z0 \end{pmatrix} \quad (1)$$

$$\text{where}\begin{cases} \theta = \cos^{-1}\{x0/(x0^2 + y0^2)^{1/2}\} \\ \phi = \cos^{-1}\{(x0^2 + y0^2)^{1/2}/d\} \\ d = (x0^2 + y0^2 + z0^2)^{1/2} \end{cases}$$

According to equation (1), the amount of vertical movement (x) and the amount of horizontal movement (y) in the real space of the image (Q) of the vehicle 2 on the display screen DS can be calculated by a predetermined coordinate conversion using the 3D first rotational matrix (first term on right side) having the directional angle θ as a parameter, the 3D second rotational matrix (second term on right side) having the dip angle φ as a parameter, the camera coefficient f determined by both the amount of vertical movement u and the amount of horizontal movement v on the display screen DS, the focal distance of the image pickup camera 3 and the properties of the camera 3 (third term on right side), and the information of the position (x0,y0,z0) of the camera 3 (fourth term on right side). Note that the "properties of the camera 3", in the case of a camera using a CCD, are physical amounts determined by the number of pixels of the CCD, the size of the CCD, and the like.

Further, referring to FIG. 5, the point of intersection of the extension of the line 24 connecting the perspective P of the image pickup camera 3 and the point Q of the image on the display screen DS and the screen corresponding area 23 on the road 1 becomes the coordinates R(x,y,0) of the point R to be found. It is therefore possible to calculate the actual amount of movement of the vehicle 2 in real space (that is, the speed of the vehicle).

Therefore, the following equation (2) is derived from the above equation (1).

$$\begin{pmatrix} x \\ y \\ 0 \end{pmatrix} = k \begin{pmatrix} x' - x0 \\ y' - y0 \\ z' - z0 \end{pmatrix} + \begin{pmatrix} x0 \\ y0 \\ z0 \end{pmatrix} \quad (2)$$

In equation (2), k is the parameter specifying the gradient of the line 24 shown in FIG. 5 in the three-dimensional coordinate system (X-Y-Z). The parameter k is simply found from the lowermost level $(0, z'-z0, z0)$ in the matrix of the above equation (2), i.e., $(z0/(z0-z'))$, while the coordinate R(x,y) to be found is derived as shown in the following equation (3):

$$\left. \begin{array}{l} x = \dfrac{z0}{z0 - z'}(x' - x0) - x0 \\ y = \dfrac{z0}{z0 - z'}(y' - y0) + y0 \end{array} \right\} \quad (3)$$

The display screen DS is comprised of the consecutive image frames (Pn−1, Pn, Pn+1 ... ). In the image frame Pn, if the actual location of the vehicle 2 in real space obtained based on the above equations is Ln, then Ln has the coordinates (xn,yn). Similarly, in the just previous image frame Pn−1, if the actual location of the vehicle 2 in real space obtained based on the above equations is Ln−1, then Ln−1 has the coordinates (x(n−1),y(n−1)).

Therefore, the distance of movement D of the vehicle 2 is found by the following equation (4) from the above locations Ln and Ln−1:

$$D = [\{xn - x(n-1)\}^2 + \{yn - y(n-1)\}^2]^{1/2} \quad (4)$$

The time T for the change from Pn−1 to Pn of the image frame is known and is normally T=1/30 s or 1/60 s. The speed V of the vehicle found here becomes as shown in the following equation (5):

$$V = D/T \quad (5)$$

In the above explanation, nothing particular was said about how to find the amount of vertical movement and amount of horizontal movement of the image of the vehicle 2 on the display screen DS, but two or three examples of how to find them will be explained below.

First, there is the method of using histograms for calculating the amount of movement of the image.

Figure 6:
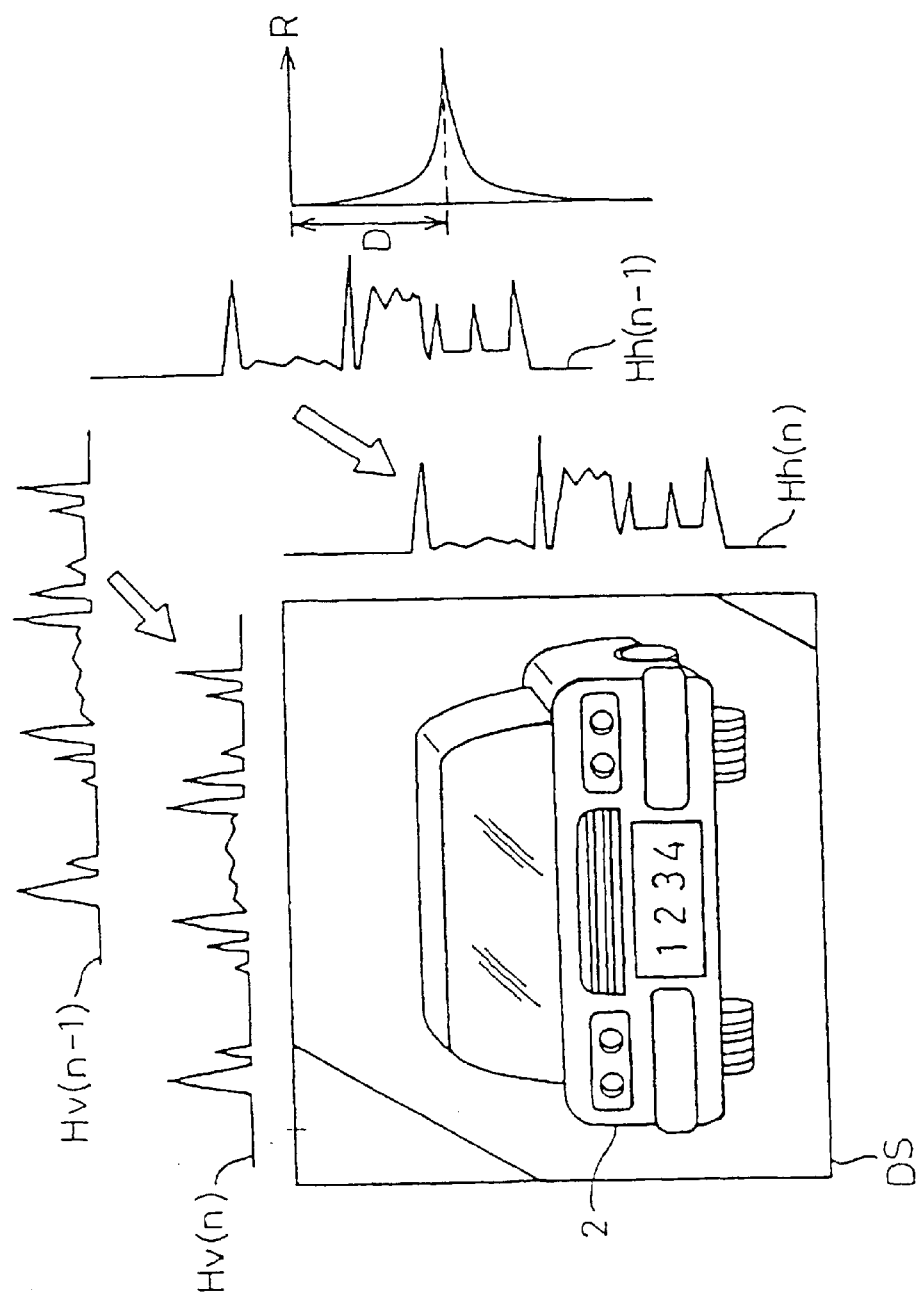
FIG. 6 is a view for explaining the measurement of the amount of movement of an image using histograms.

FIG. 6 is a view for explaining the measurement of the amount of movement of the image using histograms.

The figure shows the image of a vehicle 2 in motion projected on the display screen DS. The image contains a large number of elements of horizontal edges of the vehicle. For example, these include the horizontal portion of the bumper, the horizontal portion of the license plate, and the horizontal portion of the chassis. The image data for each of the horizontal portions is cumulatively added in the horizontal direction to obtain the histogram (H). The Hh(n) shown at the right side of the figure is the histogram of the horizontal direction (h) obtained in the image frame Pn.

Further, Hh(n−1) is, the histogram of the horizontal direction obtained in the image frame Pn−1 a predetermined time (for example, 1/30 s) before.

The correlation between the thus obtained consecutive horizontal direction histograms is found and the peak value of the correlation is detected. At the right side of the figure is shown a graph of the change in the correlation (R). Here, the distance D to the peak value is the amount of vertical movement.

In the present invention, the amount of-movement of the vehicle is found from the deviation of the image of the vehicle moving at a certain angle on the display screen DS, so it is necessary to find similar histograms for the vertical direction.

The image of the vehicle 2 in motion projected on the display screen also contains elements of the vertical edges of the vehicle. For example, there is the vertical portion of the license plate. Therefore, the image data of each of the vertical portions is cumulatively added in the vertical direction to obtain the histogram (H). The Hv(n) shown at the top of the figure is the histogram of the vertical direction (v) obtained in the image frame Pn. Further, the Hv(n−1) is the histogram in the vertical direction obtained in the image frame Pn−1 a predetermined time (for example, 1/30 s) before.

The correlation between histograms is found for the consecutive vertical direction histograms thus obtained and the peak value of the correlation is detected. As shown by the graph the same as the graph at the right side of the figure, the distance to the peak value becomes the amount of horizontal movement.

Figure 7:
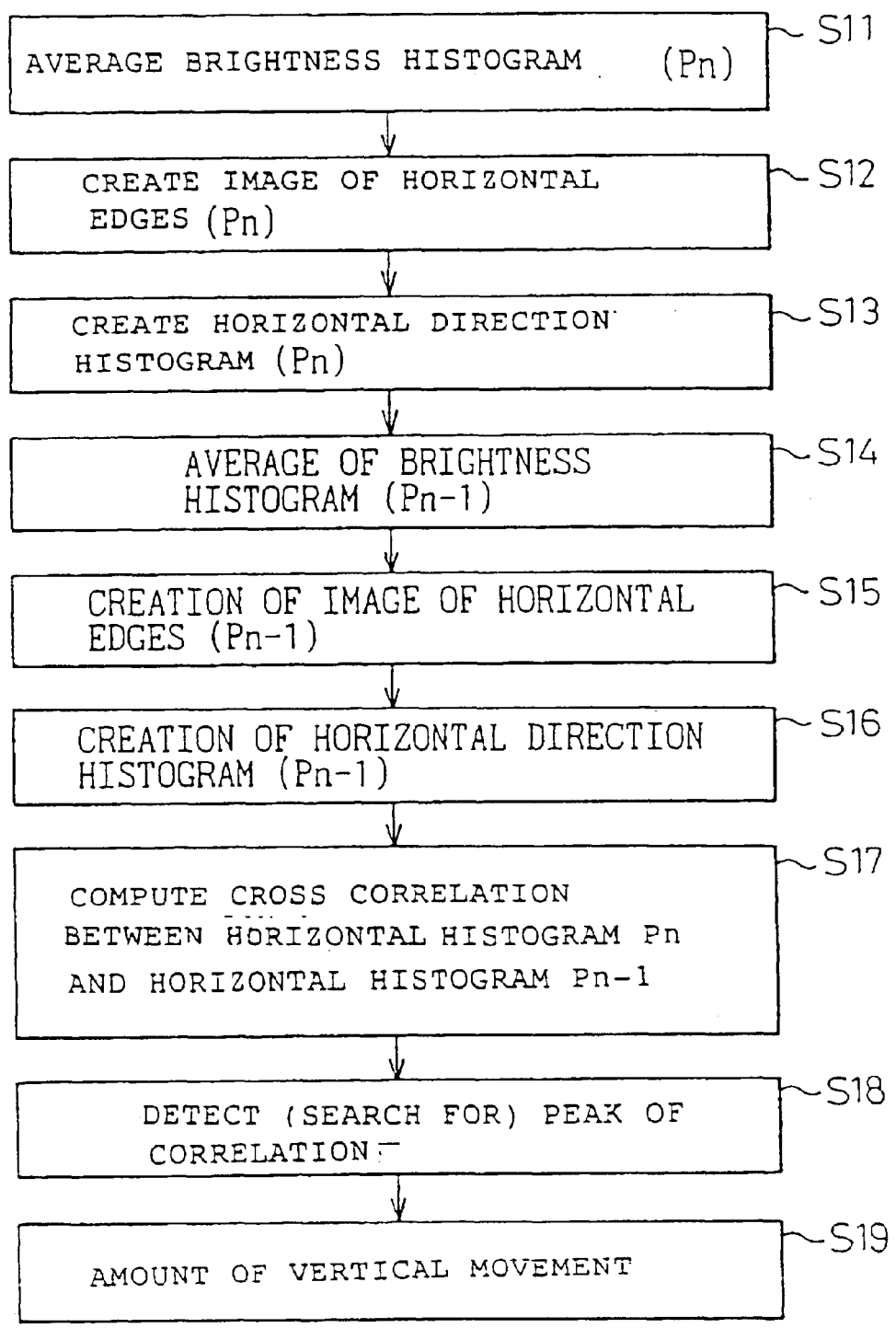
FIG. 7 is a flow chart of an example of the processing for calculating the amount of vertical movement from a horizontal direction histogram.

FIG. 7 is a flow chart of an example of the processing for calculating the amount of vertical movement using horizontal direction histograms.

In the figure, steps S12 and S13 are steps for obtaining the horizontal direction histogram Hh(n) in the image frame Pn, while steps S15 and S16 are steps for obtaining the horizontal direction histogram Hh(n−1) in the image frame Pn−1.

Steps S17 and S18 are steps for detecting the peak value of the cross correlation as explained using the graph shown at the right side in FIG. 6, while step S19 calculates the amount of vertical movement of the image of the vehicle 2 to be sought. Note that steps S11 and S14 will be explained later.

Figure 8:
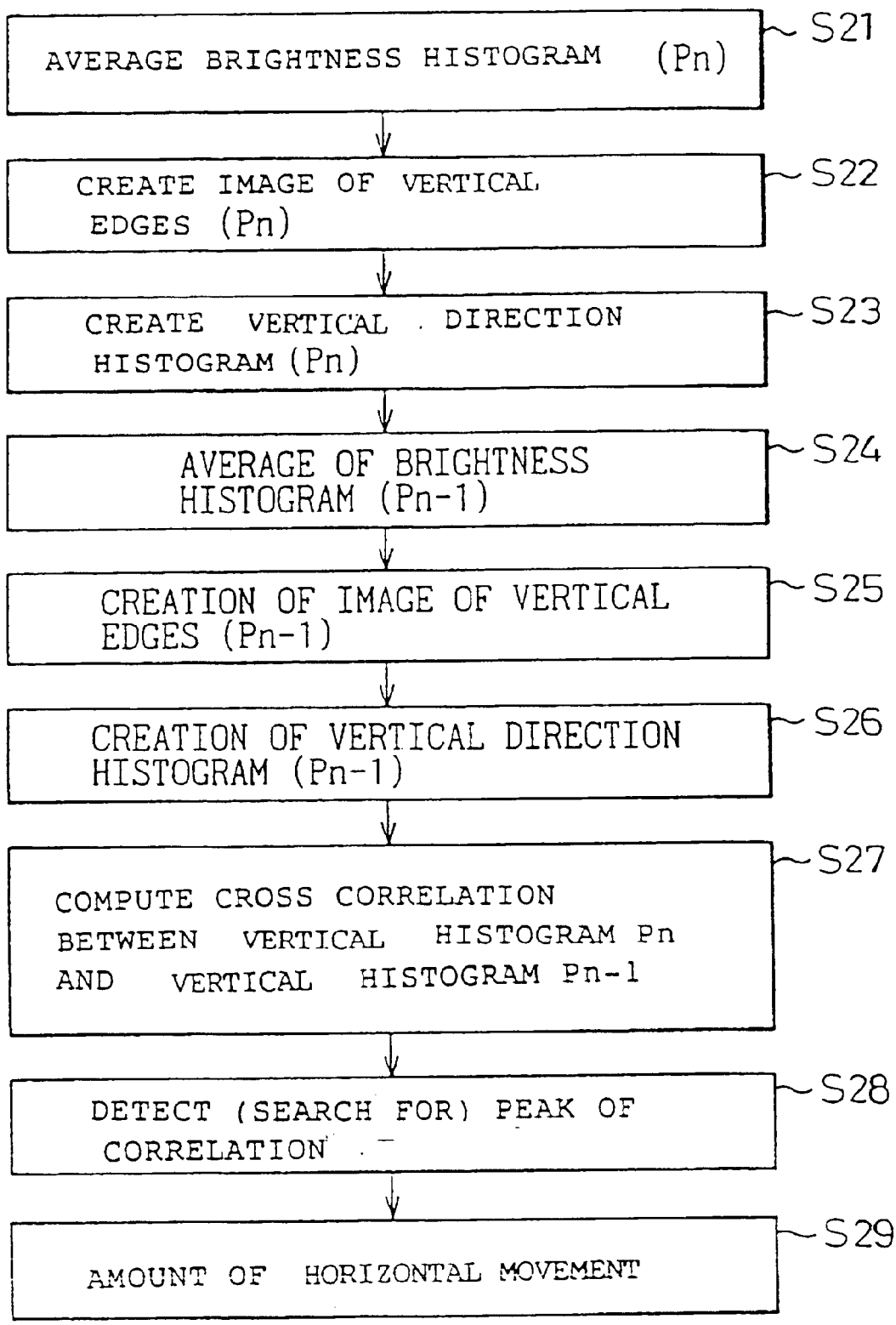
FIG. 8 is a flow chart of an example of the processing for calculating the amount of horizontal movement from a vertical direction histogram.

FIG. 8 is a flow chart of an example of the processing for calculating the amount of horizontal movement using vertical direction histograms.

In the figure, steps S22 and S23 are steps for obtaining a vertical direction histogram Hv(n) in the image frame Pn, while steps S25 and S26 are steps for obtaining a vertical direction histogram Hv(n−1) in the image frame Pn−1.

Steps S27 and S28 are steps for detecting the peak value of the cross correlation in the same way as explained using the graph shown at the right side of FIG. 6. Step S29 calculates the amount of horizontal movement of the image of the vehicle 2 to be sought. Note that steps S21 and S24 will be explained below together with the aforesaid steps S11 and S14.

When extracting the horizontal edges and vertical edges at the above-mentioned steps S12 (FIG. 7) and S22 (FIG. 8), the contrast of the surroundings of the vehicle 2 has an effect on the accuracy obtained. For example, it is easy to extract horizontal edges and vertical edges from the image of a vehicle driving under direct sunlight. It is however hard to extract the horizontal edges and vertical edges at a high accuracy from the image of a vehicle driving at sunset.

Therefore, when creating the horizontal direction histogram Hh for the image of a vehicle 2, it is preferable to include a step of tracking the change in contrast surrounding the vehicle 2 and averaging the contrast for finding the elements of the horizontal edges.

Similarly, when creating the vertical direction histogram Hv for the image of a vehicle 2, it is preferable to include a step of tracking the change in contrast surrounding the vehicle 2 and averaging the contrast for finding the elements of the vertical edges.

Referring to FIG. 7, the steps for averaging the contrast are steps S11 and S14. Brightness histogram averaging processing is performed for preparing the brightness histogram on the display screen DS and averaging it.

Similarly, referring to FIG. 8, the steps for averaging the contrast are steps S21 and S24. Brightness histogram averaging processing is performed for preparing the brightness histogram on the display screen DS and averaging it.

The second method of calculating the amount of vertical movement and amount of horizontal movement of the image of the vehicle 2 is the known method performed based on motion compensation image coding techniques.

That is, by performing motion estimation between image frames captured at predetermined time intervals, it is possible to accurately measure the amount of movement of the vehicle 2. The search range of the motion is in principle the entire screen. The amount of movement between the image frames of the vehicle 2 is detected as the vector amount of motion.

Figure 9:
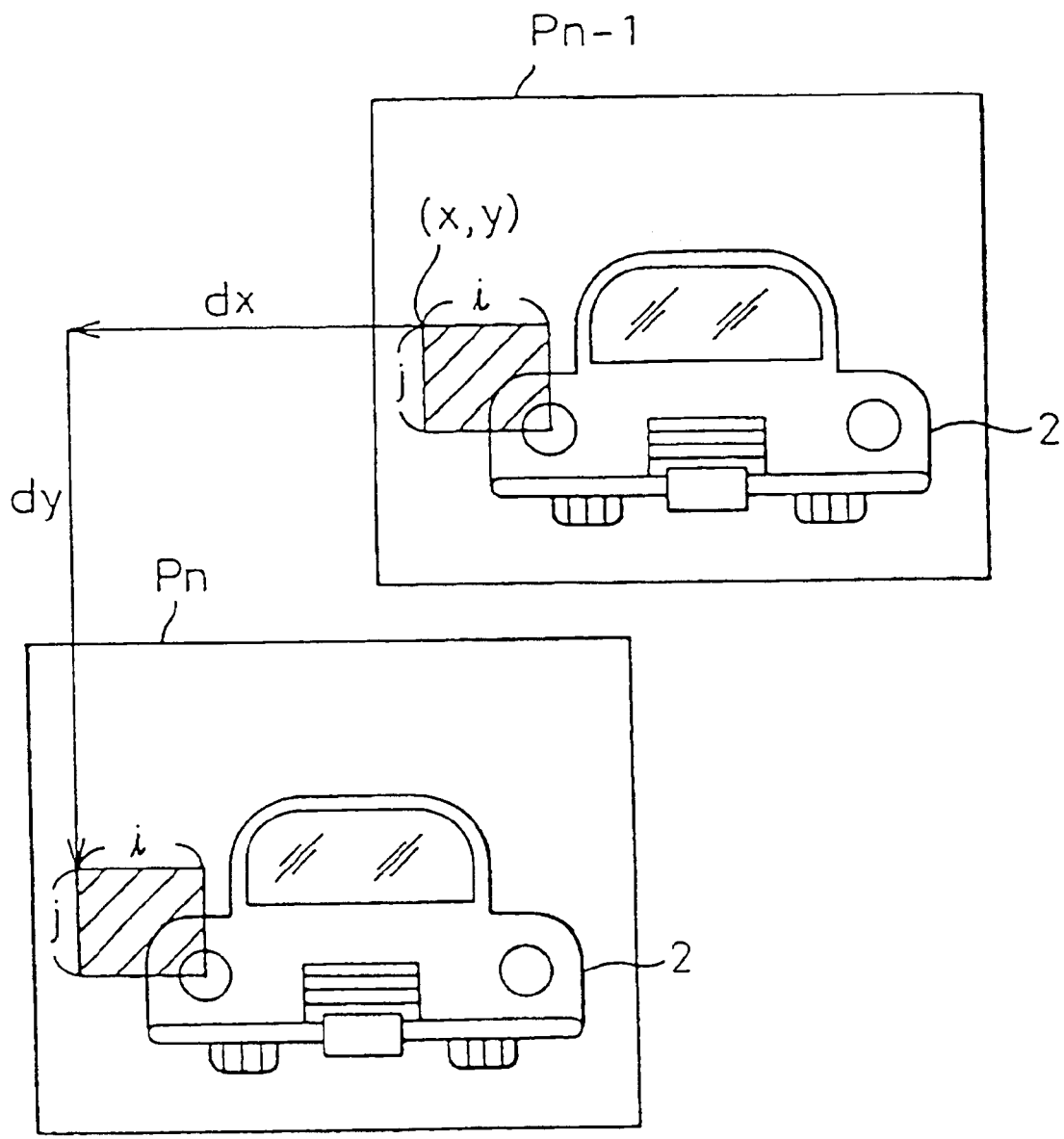
FIG. 9 is a view for explaining the processing for motion compensation.

FIG. 9 is a view for explaining the motion compensation processing.

In the figure, looking at any one rectangle (shown by hatching) when dividing the screen into a plurality of rectangles, the rectangle in the image frame Pn−1 moves dx in the horizontal direction and moves dy in the vertical direction in the image frame Pn. The search range of the rectangle, as shown, is i in the horizontal direction and j in the vertical direction from the starting point (x,y). Here, the difference degree E (dx,dy) of the image between the rectangular area in the image frame Pn−1 and the rectangular area in the image frame Pn is expressed by the following equation (6):

$$E(dx,dy)=\Sigma |Pn(x+i, y+j) - Pn-1(x+i+dx, y+j+dy)| \quad (6)$$

As clear from this equation, the above difference degree E (dx,dy) corresponds to the result of cumulative addition of the sums of the differential absolute values with respect to the target rectangle. The accumulation range is (i,j). A specific example of the above processing will be explained with reference to FIG. 10.

Figure 10:
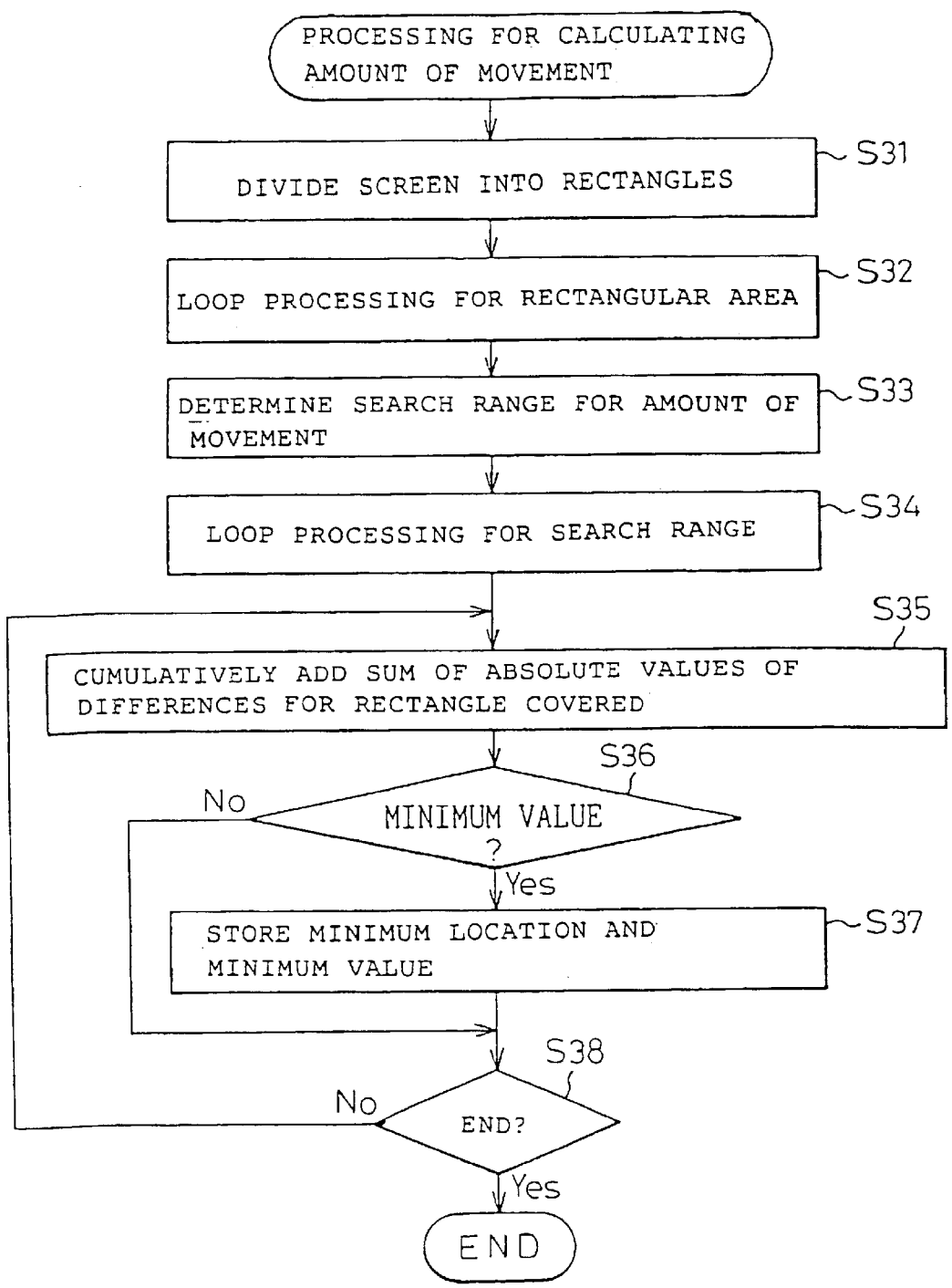
FIG. 10 is a flow chart of an example of the processing for calculating the amount of movement by motion compensation image coding techniques.

FIG. 10 is a flow chart of an example of the processing for calculation of the amount of movement by motion compensation image coding.

At step S31, the display screen DS is divided into a plurality of rectangles (one of which is shown by hatching in FIG. 9).

At step S32, loop processing, that is, raster scanning, is performed on the rectangular area.

At step S33, the range for searching the amount of movement is determined. From which image frame to which image frame to search is determined.

At step S34, loop processing for each determined image frame is performed.

At step S35, calculation is performed by the above equation (6).

At step S36, whether the value calculated by equation (6) is the minimum up to now is determined.

At step S37, if the minimum value is found the location of the image on the screen where the value became the minimum, that is, the portion for measuring the amount of movement, is made a candidate. The minimum value obtained at this time is stored and used for the determination at step S36.

At step S38, it is determined if the calculation by equation (6) has been performed over the entire search range. If all completed, the processing for calculating the amount of movement is ended.

The above-mentioned motion compensation image coding can be used for realizing step S2 and S3 shown in FIG. 3. This technique has the advantage of enabling measurement of the amount of movement with a high accuracy, but has the disadvantage of requiring a considerably large amount of computation. Relating to this point, looking at the measurement of the amount of movement using histograms shown in FIG. 7 and FIG. 8, the technique using histograms has the advantage of requiring less computation since the processing is simple. On the other hand, the technique using histograms has the disadvantage of the susceptibility to external disturbance and noise and the inferior accuracy of measurement of the amount of movement.

Therefore, if combining the advantage of motion compensation image coding and the advantage of the technique using histograms, it is possible to achieve an ideal measurement of the amount of movement. The processing in this case is shown in FIG. 11.

Figure 11:
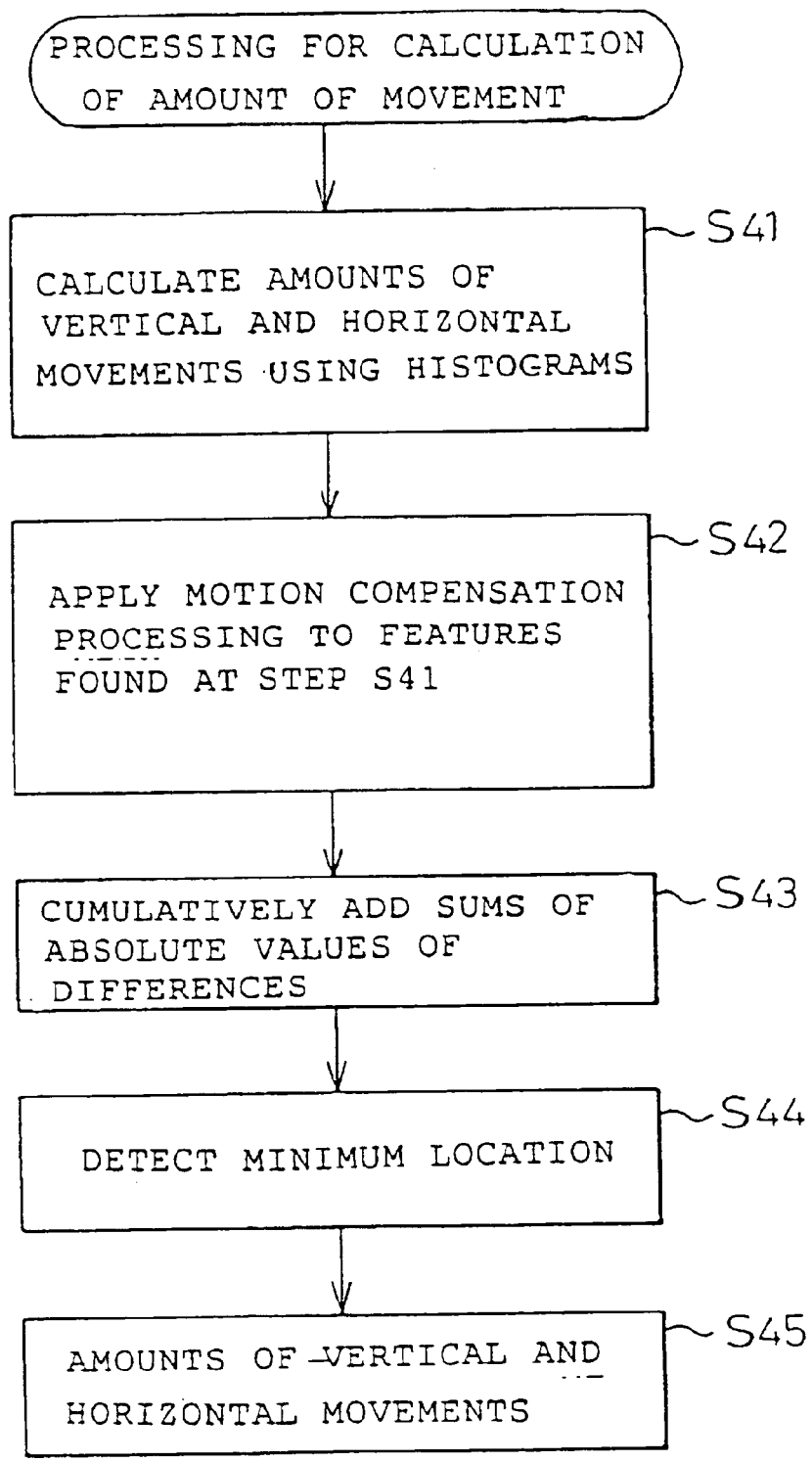
FIG. 11 is a flow chart of the combination of measurement of the amount of movement using histograms and measurement of the amount of movement by motion compensation image coding techniques.

FIG. 11 is a flow chart of a combination of measurement of the amount of movement using histograms and measurement of the amount of movement using motion compensation image coding.

According to this combination, it is possible to use the histogram technique to extract features to be measured by a small amount of computation (however, as explained above, where there is susceptibility to external disturbance and noise and the accuracy of extraction is poor) and to use motion compensation image coding to extract features with a high accuracy. In this case, since a good guess has been obtained about the features by the histogram technique, the amount of computation when executing motion compensation image coding is greatly reduced.

In the final analysis, <1> the amount of vertical movement is calculated based on motion compensation image coding for a predetermined feature area containing the image of the vehicle 2 on the display screen DS obtained at the time of calculating the amount of vertical movement by horizontal direction histograms. Further, <2> the amount of horizontal movement is calculated based on motion compensation image coding for a predetermined feature area containing the image of the vehicle 2 on the display screen DS obtained at the time of calculating the amount of horizontal movement by vertical direction histograms.

The flow chart of FIG. 11 shows the processing comprised of the combination of the above <1> and <2>.

At step S41, the same processing as in FIG. 7 and FIG. 8 is performed.

At step S42, the parts believed to be features are found in the processing of FIG. 7 and FIG. 8.

At step S43, the computation of step S35 shown in FIG. 10 is performed for the features found above.

At step S44, the same processing as in steps S36 and S37 of FIG. 10 is performed.

At step S45, the amount of movement to be found is calculated (corresponding to step S19 of FIG. 7 or corresponding to step S29 of FIG. 8).

The features found at step S42 in FIG. 11 are ones of low accuracy. More accurate features are sought based on motion compensation image coding. The amount of computation required for finding such features, however, is generally large.

Therefore, it is desirable to extract features more simply by motion compensation image coding. There are the following two techniques for simplification.

Figure 12:
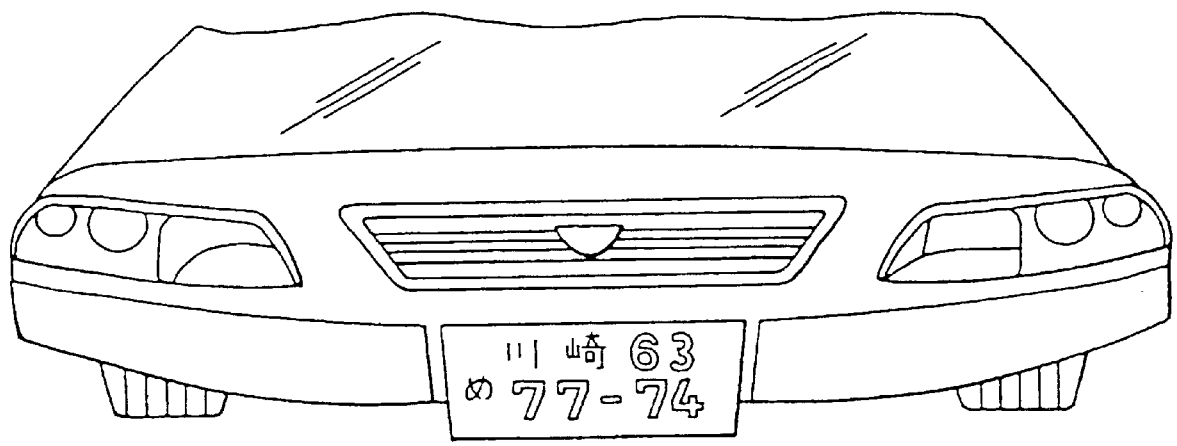
FIG. 12 is a view of an example of capture of the front of a vehicle by an image pickup camera.

The first technique for simplification takes note of the notable feature portions in the image showing the front of the vehicle 2 (same for second technique for simplification explained later). One example of such a notable feature portion is the license plate of the vehicle 2. FIG. 12 is a view of an example of the front view of the vehicle captured by an image pickup camera.

Taking note of the license plate of the figure, a Japanese license plate for example carries the name of the issuing motor vehicles department, vehicle classification number, a phonetic symbol, and series of numbers. These characters and numerals are arranged at equal pitches in the horizontal direction. For example, in the case of the motor vehicles department and vehicle classification number of the first row, the pitch of the character string extends from CPmin to CPmax (CP: character pitch). At this time, the frequency of the image signal obtained when scanning the character string ranges from fmin to fmax.

$$fmin=TL/CPmin$$

$$fmax=TL/CPmax$$

TL is a predetermined length (horizontal direction) on the license plate.

Therefore, by performing filter (bandpass filter) processing giving a peak in the above fmin to fmax band in the horizontal direction, it becomes possible to extract the image of the license plate as a feature of the vehicle. That is, it is possible to extract the image signal having the signal component appearing with a constant period from the image signals forming the image of the vehicle 2 on the screen by filter (bandpass filter) processing and use the image of the portion (license plate) corresponding to that extracted image signal as the feature area. An example of the processing in this case is shown in FIG. 13.

Figure 13:
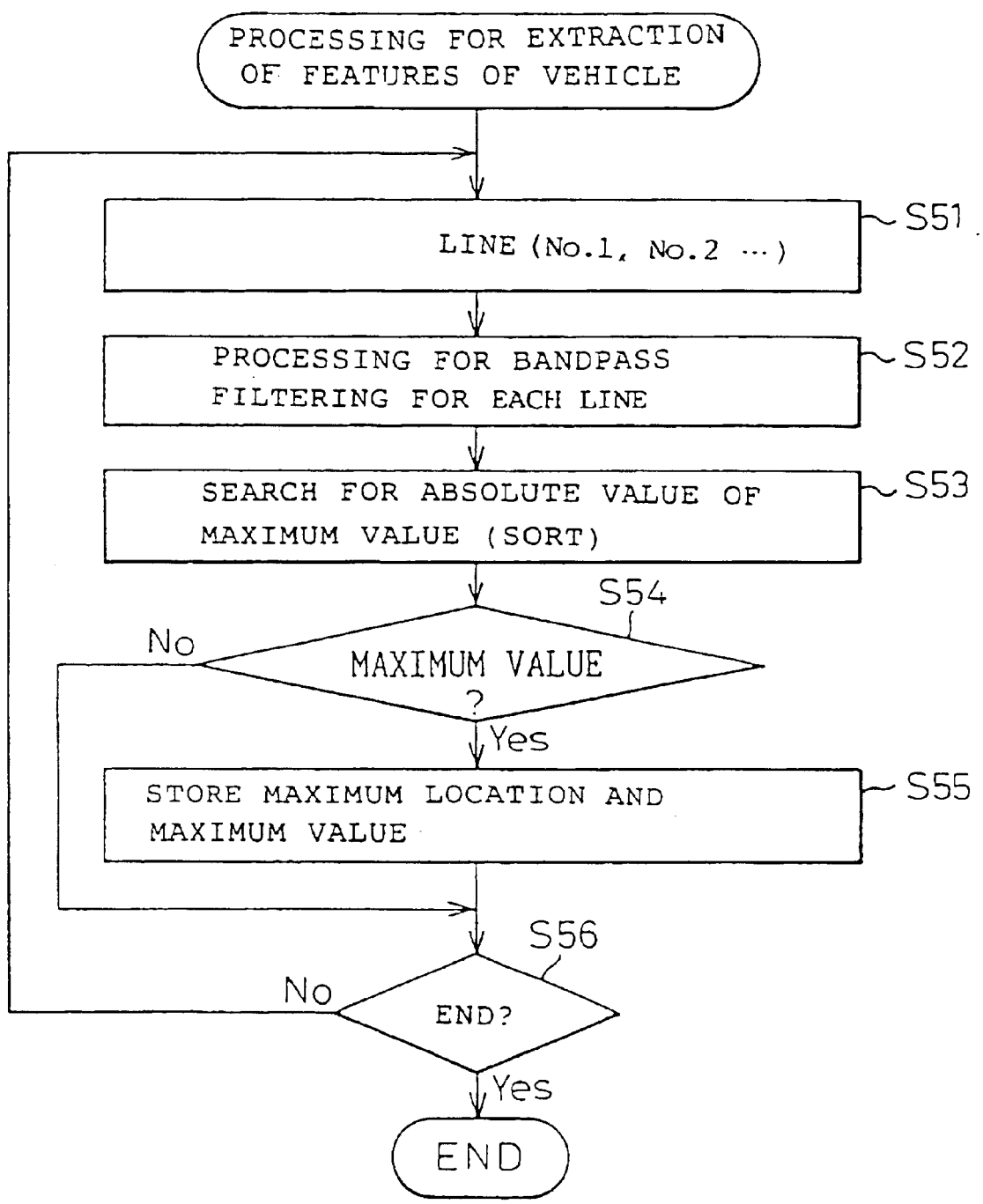
FIG. 13 is a flow chart of an example of the processing for extracting features by using a bandpass filter.

FIG. 13 is a flow chart of an example of the processing for extracting features by a bandpass filter.

At step S51, first a scan is performed from the first line (no. 1).

At step S52, the above bandpass filter processing is performed on the first line.

At step S53, the maximum value of the filter signal obtained by the above bandpass filter processing is searched for. When black letters or numbers are printed on a white license plate, it appears as a positive value, but when white letters or numbers are printed on a black license plate, the maximum value appears as a negative value. Therefore, in this step, the absolute value of the maximum value is sought.

At step S54, it is determined if the maximum value obtained from step S53 is the true maximum value in all lines.

At step S55, when the true maximum value has been found, the location on the line at that time is detected and forms part of the feature. Further, the maximum value at that time is stored and used for the determination at step S54.

When the scan of the first line ends, the line no. at step S51 is incremented by 1 (N=2), and the process of FIG. 13 is repeated. When feature extraction has completed, the process ends at step S56.

Taking note of step S52 of FIG. 13, it is possible to adopt a simplified method for the bandpass filter processing at this step.

The image signal obtained by scanning the character and number portion of the license plate becomes a succession of "1"'s and a succession of "0"'s such as:

(11 . . . 1, 00 . . . 0, 11 . . . 1, 00 . . . 0)

This is subjected to a convolution operation by the length CYC. The CYC is found from the above CPmin and CPmax as $$CYC=(CPmin+CPmax)/2$$

This being done, the presence of a periodic signal component is simply detected. If a periodic signal component is found, this is the portion of the license plate.

In the above bandpass filter processing, it is necessary to prepare several types of bandpasses as filter banks. The reason is that when capturing a vehicle 2 driving far from the image pickup camera 3, the above CP is small, so a wide band bandpass filter is necessary. Conversely, when capturing a vehicle 2 driving near the image pickup camera 3, the above CP is large, so a narrow band bandpass filter is necessary. Further, there is a difference in the length of characters and numerals between the CP at the license plate of a large-sized car and the CP at a license plate of a small-sized car.

When it is necessary to avoid preparing a plurality of types of bandpass filters, it is preferable to perform conversion on the image signal of the area of the signal corresponding to the license plate to convert it to a frequency domain signal. The flow chart of the processing at this time is substantially the same as the flow chart of FIG. 13 except for step S52. At this time, the step corresponding to step S52 becomes the step for performing the above conversion on the image signal of the portion assumed to be the feature area (set of features). The assumption may be performed at the time when calculating the amount of movement by the aforementioned histograms.

The above conversion may be one-dimensional discrete cosine transform (DCT) or fast fourier transform (FFT). In the values obtained by the one-dimensional DCT or FFT, there is a feature area (feature) at the portion showing the peak.

Summarizing the effects of the invention, as explained above, according to the present invention, it becomes possible to accurately measure the speed of a vehicle 2 traveling on a road 1 based on an image obtained by capturing the vehicle 2 from a direction at a diagonally upward angle with respect to the direction of travel of the vehicle 2. Therefore, the image pickup camera 3 for capturing the image can be mounted at the top of a single supporting pole 6 provided at the side of the road 1 and the existing problems of the related art can be simultaneously solved.

What is claimed is:

1. A method for measuring the speed of a vehicle comprising:

a first step of capturing a vehicle in motion by an image pickup unit mounted on a support provided at the side of a field, a second step of calculating an amount of movement in the vertical direction by an image of the vehicle captured by the image pickup unit on a display screen displaying the image, a third step of calculating an amount of movement in the horizontal direction by the image of the vehicle captured by the image pickup unit on the display screen displaying the image;

a fourth step of converting the calculated amount of vertical movement and amount of horizontal movement based on information of the capture location of the image pickup unit in the real space of the vehicle and information of the attitude of the image pickup unit to an amount of forward and backward direction movement and an amount of left and right direction movement in that real space; and a fifth step of computing the speed of the vehicle from the amount of forward and backward direction movement and an amount of left and right direction movement in the real space of the vehicle and the movement time;

further comprising the additional steps of:

defining the information of the attitude of the image pickup unit by a directional angle ($\theta$) comprising an angle of offset from a first axis corresponding to a direction of travel of the vehicle in a three-dimensional coordinate system defining the real space and a dip angle ($\Phi$) comprising an angle of offset from a plane defined by the first axis in the real space and a second axis orthogonal to it and, at that time, using a predetermined coordinate conversion using a 3D first rotational matrix having the directional angle ($\theta$) as a parameter, a 3D second rotational matrix having the dip angle ($\Phi$) as a parameter, a camera coefficient (f) determined by the amount of vertical movement (u) and the amount of horizontal movement (v) on the display screen, a focal distance of the image pickup unit, and properties of the image pickup unit, and information of a location of the image pickup unit to calculate the amount of forward and backward direction movement and the amount of left and right direction movement of the vehicle in real space, so as to enable a computation of a speed of an object moving in an inclined direction within the image captured by the image pickup unit.

2. A method for measuring the speed of a vehicle as set forth in claim 1, wherein the predetermined coordinate conversion is expressed by the following coordinate conversion equation:

$$\begin{pmatrix} x' \\ y' \\ z' \end{pmatrix} = \begin{pmatrix} \cos\theta & \sin\theta & 0 \\ -\sin\theta & \cos\theta & 0 \\ 0 & 1 & 1 \end{pmatrix} \begin{pmatrix} -\sin\theta & 0 & \cos\phi \\ 0 & 1 & 0 \\ \cos\phi & 0 & \sin\phi \end{pmatrix} \begin{pmatrix} f \\ u \\ v \end{pmatrix} + \quad (1)$$

$$\begin{pmatrix} x0 \\ y0 \\ z0 \end{pmatrix} \begin{pmatrix} \text{where} \\ \theta = \cos^{-1}\{x0/(x0^2 + y0^2)^{1/2}\} \\ \phi = \cos^{-1}\{(x0^2 + y0^2)^{1/2}/d\} \\ d = (x0^2 + y0^2 + z0^2)^{1/2} \end{pmatrix}$$

where the coordinates expressing the location of the image of the vehicle on the display screen in terms of a 3D coordinate system defining the real space are made (x', y', z') and the coordinates expressing the location of the image pickup unit, from which the vehicle is viewed, in terms of a 3D coordinate system defining the real space are made (x0, y0, z0).

3. A method for measuring the speed of a vehicle as set forth in claim 1, further comprising creating a horizontal direction histogram obtained by cumulatively adding only the elements of the horizontal edges present in the image of the vehicle on the display screen for the image frame (Pn) of a certain time, creating a similar horizontal direction histogram for the image frame (Pn−1) of a predetermined time before that time, finding the correlation between these two horizontal direction histograms, and detecting a peak of the correlation so as to calculate the amount of vertical movement on the display screen in the second step.

4. A method for measuring the speed of a vehicle as set forth in claim 3, further comprising a step of tracking a change in contrast surrounding the vehicle and averaging the contrast for finding the elements of the horizontal edges when creating the horizontal histograms for the image of the vehicle.

5. A method for measuring the speed of a vehicle as set forth in claim 4, wherein the step for averaging the contrast includes processing for creating a brightness histogram on the display screen and then averaging it.

6. A method for measuring the speed of a vehicle as set forth in claim 3, wherein the amount of vertical movement is calculated by motion compensation image coding for a predetermined feature area including the image of the vehicle on the display screen found when calculating the amount of vertical movement by the horizontal direction histograms.

7. A method for measuring the speed of a vehicle as set forth in claim 1, further comprising creating a vertical direction histogram obtained by cumulatively adding only the elements of the vertical edges present in the image of the vehicle on the display screen for the image frame (Pn) of a certain time, creating a similar vertical direction histogram for the image frame (Pn−1) of a predetermined time before that time, finding the correlation between these two vertical direction histograms, and detecting the peak of the correlation so as to calculate the amount of horizontal movement on the display screen in the third step.

8. A method for measuring the speed of a vehicle as set forth in claim 7, further comprising a step of tracking a change in contrast surrounding the vehicle and averaging the contrast for finding the elements of the vertical edges when creating the vertical histograms for the image of the vehicle.

9. A method for measuring the speed of a vehicle as set forth in claim 8, wherein the step of averaging the contrast includes processing for creating a brightness histogram on the display screen and then averaging it.

10. A method for measuring the speed of a vehicle as set forth in claim 7, wherein the amount of horizontal movement is calculated by motion compensation image coding for a predetermined feature area including the image of the vehicle on the display screen found when calculating the amount of horizontal movement by the vertical direction histograms.

11. A method for measuring the speed of a vehicle as set forth in claim 1, wherein the amount of vertical movement and the amount of horizontal movement is calculated by the second step and third step based on motion compensation image coding for a feature area containing the image of the vehicle on the display screen.

12. A method for measuring the speed of a vehicle as set forth in claim 11, further comprising extracting by filter processing an image signal having a signal component appearing at a predetermined period in an image signal, forming an image of the vehicle on the display screen, and using the image of the portion corresponding to the extracted image signal as the feature area.

13. A method for measuring the speed of a vehicle as set forth in claim 11, further comprising performing one-dimensional DCT or FFT on an image signal of a portion believed to be a feature area in the image signal of the vehicle on the display screen and designating the portion corresponding to a peak in the values obtained by the processing as a feature area.

14. An apparatus for measuring the speed of a vehicle comprising:

an image pickup unit mounted on a support provided at a side of a field and capturing a vehicle in motion, a unit for calculating an amount of movement in the vertical direction by an image of the vehicle output by the image pickup unit on a display screen displaying the image, a unit for calculating an amount of movement in the horizontal direction by the image on the display screen, a unit for converting the amount of vertical movement and amount of horizontal movement on the display screen calculated by the vertical movement calculating unit and horizontal movement calculating unit based on information of the location of the image pickup unit in the real space of the vehicle and information of the attitude of the image pickup unit to an amount of forward and backward direction movement and an amount of left and right direction movement in that real space, and a unit for computing the speed of the vehicle from the amount of forward and backward direction movement and an amount of left and right direction movement in the real space of the vehicle and the movement time;

wherein information of the attitude of the image pickup unit is defined by a directional angle ($\theta$) comprising an angle of offset from a first axis corresponding to a direction of travel of the vehicle in a three-dimensional coordinate system defining the real space and a dip angle ($\Phi$) comprising an angle of offset from a plane defined by the first axis in the real space and a second axis orthogonal to it and, at that time, said unit for converting using a predetermined coordinate conversion using a 3D first rotational matrix having the directional angle ($\theta$) as a parameter, a 3D second rotational matrix having the dip angle ($\Phi$) as a parameter, a camera coefficient (f) determined by the amount of vertical movement (u) and the amount of horizontal movement (v) on the display screen, a focal distance of the image pickup unit, and properties of the image pickup unit, and information of a location of the image pickup unit to calculate the amount of forward and backward direction movement and the amount of left and right direction movement in real space, so as to enable a computation of a speed of an object moving in an inclined direction within the image captured by the image pickup unit.

* * * * *